Figure 1:
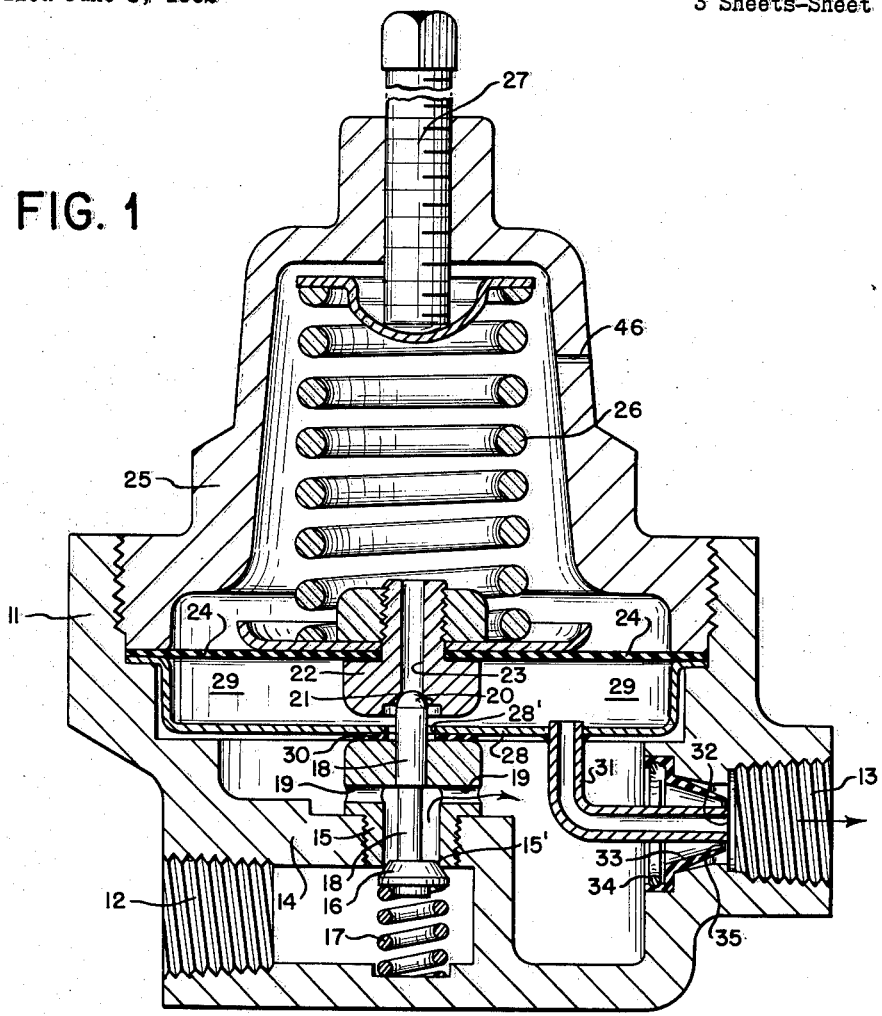

April 23, 1963   M. O. GALIGER ET AL   3,086,548
SELF-REGULATING PITOT FOR REGULATOR VALVES
Filed June 8, 1962   3 Sheets-Sheet 1

INVENTORS
MICHAEL O. GALIGER
JOHN T. MULLER
BY
ATTORNEYS

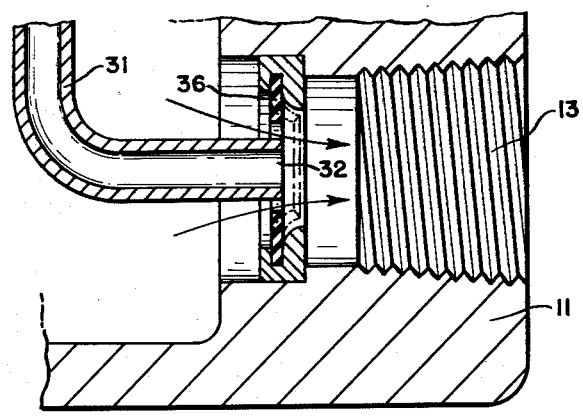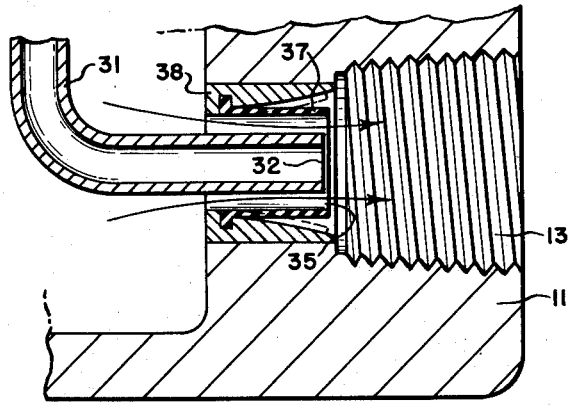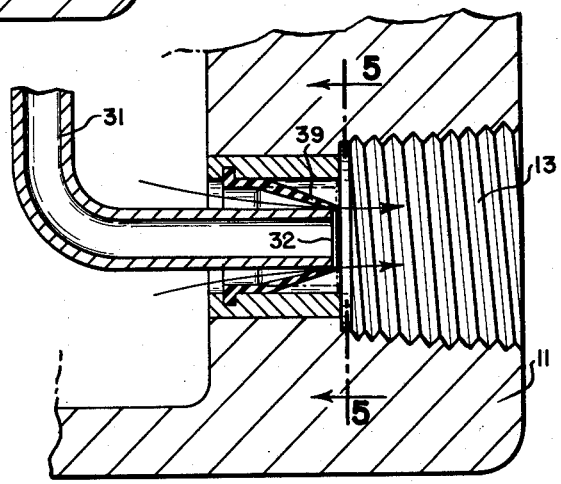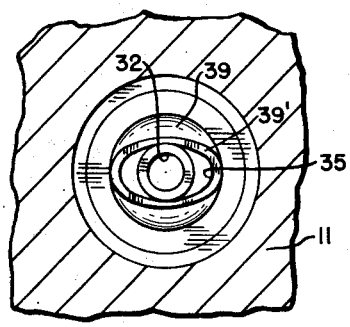

April 23, 1963  M. O. GALIGER ET AL  3,086,548
SELF-REGULATING PITOT FOR REGULATOR VALVES
Filed June 8, 1962  3 Sheets-Sheet 3

INVENTORS
MICHAEL O. GALIGER
JOHN T. MULLER
BY
ATTORNEYS

# United States Patent Office 3,086,548
Patented Apr. 23, 1963

3,086,548
SELF-REGULATING PITOT FOR REGULATOR VALVES
Michael O. Galiger, West Paterson, and John T. Muller, Nutley, N.J., assignors to Leslie Co., Lyndhurst, N.J., a corporation of New Jersey
Filed June 8, 1962, Ser. No. 201,161
7 Claims. (Cl. 137—484.8)

This invention relates to regulator valves and, more particularly, to an improved construction which results in more uniform control of the regulation over a wider range of fluid flow rates than has been possible with valves of the prior art.

The essential features of a regulator valve comprise a valve body having an inlet port and an outlet port with a regulating valve positioned therebetween. The valve is mounted on a stem which engages a diaphragm exposed to the pressure of fluid in the downstream side of the valve. A main valve spring urges the valve into the closed position, and a regulating spring bearing against the outside surface of the diaphragm tends to urge the diaphragm, and hence the valve stem, in a direction such as to open the valve. By controlling the compression of the regulating spring against the resilience of the diaphragm and of the valve spring, the position of the valve can be controlled so that it remains closed when there is no demand on the downstream side of the valve but opens when such a demand is created.

By careful attention to the design of the regulating valve components, the valve first opens in such a controlled manner that a substantially linear relationship exists between the flow of fluid through the valve and the demand on the downstream side of the valve. However, as the rate of flow of fluid increases beyond a rather limited value, the unit sensitivity of the valve decreases and requires a greater increment of valve opening for an increment in flow demand. This results in a pressure-flow curve in which the pressure on the downstream side falls slowly with initial increases in the flow rate but falls precipitately when the flow rate exceeds this relatively limited value.

In order to partially offset this characteristic of a regulating valve, it has been common heretofore to use the velocity effect provided by a Pitot tube one end of which is positioned in the throat of the outlet port of the valve and the other end of which communicates with a chamber which isolates the diaphragm from direct contact with the fluid on the downstream side of the valve except through the Pitot tube. This Pitot tube creates in the diaphragm chamber a decrease in pressure which is proportional to the square of the velocity of the fluid flowing through the outlet port. As a result, the Pitot tube tends to exaggerate the response of the diaphragm to the demand so as to maintain a substantially uniform pressure in the downstream side of the valve over a greater range of flow than is possible with the basic form of regulating valve. However, as the velocity of the fluid through the valve increases beyond a certain value, the velocity effect on the daiphragm becomes so pronounced as to cause a rise in the pressure on the downstream side, this rise gradually ending and falling precipitately again with a further increase in the flow rate.

We have now devised a modification of a regulating valve provided with a Pitot tube which is characterized by substantially uniform control of the diaphragm action over a much larger range of flow rates than has heretofore been possible. This result is achieved pursuant to our invention by providing the pressure-sensing end of the Pitot tube with an adjacent resilient throat which is capable of being distended or moved so as to increase the cross-sectional area of flow of fluid around the Pitot tube in response to an increase in the fluid flow rate. As this cross-sectional area increases, the decrease in pressure in the diaphragm chamber created by the velocity effect of the Pitot tube lessens, and thus uniform control of the downstream pressure is maintained even at relatively high fluid flow rates.

The improved regulating valve construction of our invention will be more readily understood by reference to the accompanying drawings in which:

FIG. 1 is a cross-sectional view of the regulating valve embodying the invention; and FIGS. 2 through 10 are partial sectional views of the discharge portion of the valve showing various embodiments of our novel construction.

As shown in FIG. 1, a valve body 11 is provided with an inlet port 12 and an outlet port 13. These two ports are separated by a partition 14 including a valve seat body insert 15 having a valve seat 15' against which an operating valve 16 is urged by a valve spring 17. The valve 16 is mounted on a stem 18 which extends through the valve seat insert body 15, the latter being provided with discharge ports 19 for the flow of fluid from the inlet side of the valve to the outlet side of the valve.

The upper end of the valve stem 18 advantageously is provided, as in a conventional regulator valve, with a valve-shaped extremity 20 which engages a seat portion 21 of a pressure relief body 22 having an axial bore 23. A diaphragm 24 is secured to the relief body 22 and is clamped in position around its peripheral portions by the bonnet portion 25 of the valve. The diaphragm 24 is engaged by a regulating spring 26 positioned within the bonnet 25, and the compression of the regulating spring 26 is controlled by a threaded shaft 27 extending into the bonnet of the valve body.

It will be seen, accordingly, that the position of the control valve 16 is determined by the relative values of the compression of the valve spring 17, the fluid pressure acting on the control valve 16 and on the underside of the diaphragm 24, and the compression of the regulating spring 26.

The surface of the diaphragm 24 opposite that surface which is engaged by the regulating spring 26 is enclosed by a partition element 28. In the valve structure shown in FIG. 1, the partition element 28 is dome-shaped and its peripheral portions are clamped to the peripheral portions of the diaphragm 24. The central portion of the partition element 28 is provided with an opening 28' through which the valve stem 18 extends. A substantially fluid-tight connection between the central area of the partition element 28' and the valve seat insert body 15 is provided by a gasket 30 so as to define a diaphragm chamber 29. A Pitot tube 31 extends through the partition element 28 and has a pressure-sensing end portion 32 positioned within the valve outlet port 13. It will be seen, accordingly, that the fluid admitted through the valve 16 is admitted to the diaphragm chamber 29 primarily through the Pitot tube 31 and to a minor extent through the relatively small leakage between the valve stem 18 and the valve seat insert body 15.

Pursuant to the embodiment of our invention shown in FIG. 1, a resilient throat element is positioned within the outlet port and surrounding the pressure-sensing end 32 of the Pitot tube to form a pressure-yieldable throat opening. This resilient throat element comprises a flexible rubber-like cone frustum 33 having its larger end secured in position in the entrance to the outlet port by a retaining ring 34. The smaller end of the frustum is positioned in the downstream portion of the valve outlet port 13 near the pressure-sensing end 32 of the Pitot tube. Inasmuch as the cone frustum 33 is of flexible or resilient material, the smaller end of the cone is capable of being distended so as to have a larger cross-sectional area as the flow of fluid through the frustum increases. Thus, when the fluid in the valve flows slowly, the small end of the frustum maintains a relatively small orifice 35 for the discharge of the fluid through the outlet port 13, and this results in an exaggerated velocity of fluid flow past the pressure-sensing end 32 of the Pitot tube. However, as the demand on the downstream side of the valve is increased, the resulting increase in the rate of flow of fluid through the valve causes the resilient frustum 33 to become distended and thus increase the cross-sectional area of the orifice 35. In this way, the velocity effect of the Pitot tube is lessened with increasing rates of flow. Consequently, the Pitot tube can be designed to be more sensitive than prior art devices to low velocity flow rates without losing control at high velocity flow rates by virtue of the fact that, as the flow rate through the valve increases, the increase in the cross-sectional area of the smaller end of the frustum 33 prevents the Pitot tube from fully sensing such a high velocity. The result of this action is a substantially linear response of the valve to the downstream demand over a larger range of rates of flow through the valve than heretofore possible.

A variety of modifications of the resilient throat construction cooperating with the pressure-sensing end 32 of the Pitot tube are shown in FIGS. 2 through 9. In FIG. 2, the resilient throat is provided by a flexible or rubber-like annular ring 36 whose normal position is shown in solid lines and whose distended position is shown in dotted lines. In FIG. 3, the flexible throat has the form of a flexible cylinder 37 mounted in an outlet port insert 38 which has a tapered inner configuration which permits the downstream end of the flexible cylinder 37 to expand and thus increase the orifice 35 adjacent the pressure-sensing end 32 of the Pitot tube. The flexibility of this cylinder 37 can be enhanced by longitudinal slits or depressions extending inwardly from the downstream end of the cylinder. In FIG. 4, the resilient throat 39 is not only frusto-conical in longitudinal cross-section but, as shown in FIG. 5, which is a section taken along 5—5 in FIG. 4, the downstream end of the cone 39 has an oval lateral cross-sectional shape 39'.

Figure 6:
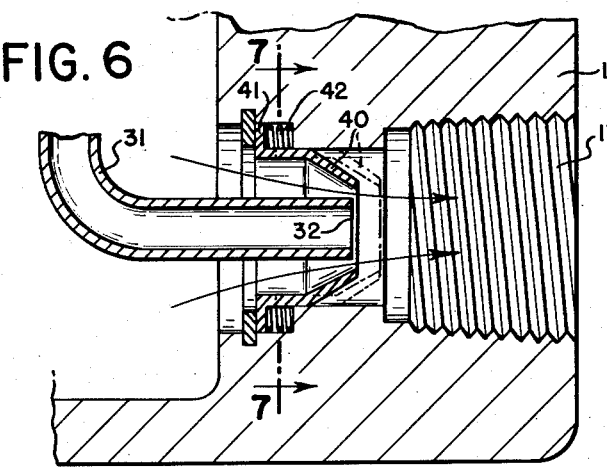
Figure 7:
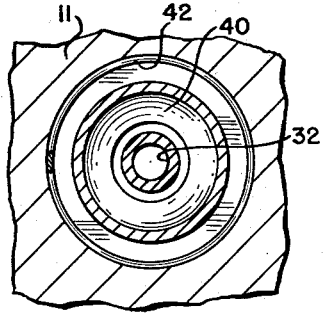

In FIGS. 6 and 7, the resilient throat is provided by a resiliently-mounted but relatively inflexible frusto-conically shaped baffle 40 whose upstream end terminates in outwardly extending shoulders 41 engaging a compression spring 42. As the velocity of the fluid flowing through the throat increases, it causes the baffle 40 to move downstream into the dotted-line position by compression of the spring 42. In this arrangement, the small end of the baffle 40 moves downstream beyond the pressure-sensing end 32 of the Pitot tube and thus provides the desired enlarged orifice around this end of the tube. It will be readily understood that the resiliently mounted inflexible baffle can have a shape other than that of a frustum such, for example, as the annular ring 36 shown in FIG. 2.

Figure 8:
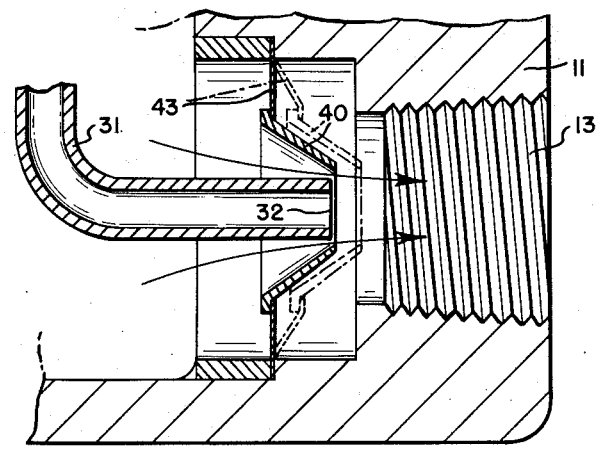
Figure 9:
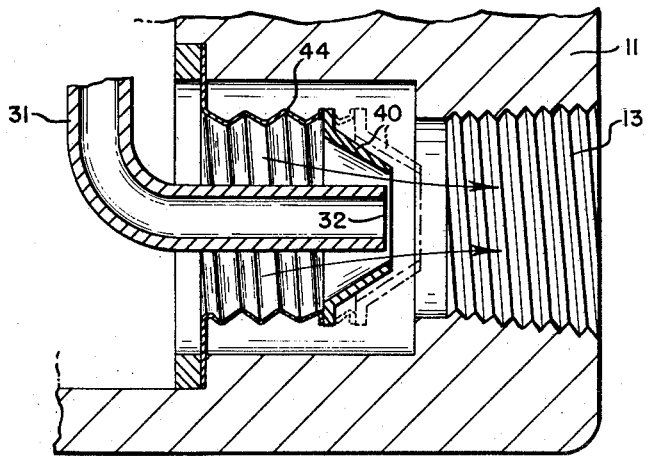

In FIGS. 8 and 9, the resilient throat is provided by a relatively inflexible frusto-conical baffle 40 which provides the necessary enlargement of the Pitot orifice by axial movement into the position shown by the dotted lines. In the modification shown in FIG. 8, the resilience of the throat baffle is provided by an annular flexible metal diaphragm 43 the inner portion of which is secured to the baffle 40 and the peripheral portion of which is mounted in the interior of the valve outlet port 13. In FIG. 9 the baffle 40 is resiliently mounted on a bellows 44 so that it can be moved axially into the dotted line position by the force of the fluid flowing through the valve outlet port 13.

Figure 10:
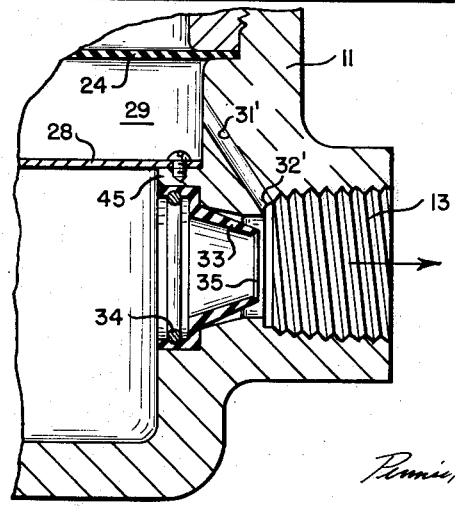

In the modification of our valve structure shown in FIG. 10, the Pitot tube comprises a port 31' communicating between the valve outlet port 13 and the diaphragm chamber 29 formed by the diaphragm 24 and a partition element 28 secured to a shoulder 45 on the upstream end of the outlet port 13. In this modification, the resilient throat is provided by a resilient or rubber-like cone frustum 33 which, as its smaller end expands, lessens the velocity effect sensed by the pressure-sensing end of the Pitot tube 32'.

Inasmuch as the velocity effect of the Pitot tube is exaggerated at low flow rates pursuant to our invention, the leakage of fluid from the interior of the valve seat insert body 15 along the valve stem 18 into the diaphragm chamber 29 has no significant influence on the sensitivity and operation of the diaphragm. This feature eliminates the necessity, conventional in prior art regulating valves, of a leak-proof seal around the valve stem 18 and hence eliminates the resistance of such a seal to movement of the valve 16. Under conditions of no demand, any excessive build-up of pressure in the demand or downstream side of the valve is relieved through the upper end of the valve stem 20, into the central bore 23 of the pressure relief body 22 and thence into the bonnet 25 and out, if necessary, through a bonnet relief port 46.

We claim:

1. In a regulator valve comprising a valve body having an inlet port and an outlet port, a valve stem, a valve mounted on the valve stem and positioned between said ports, a valve spring urging the valve into a valve-closed position, a diaphragm in operative engagement with the valve stem, a regulating spring engaging the diaphragm so as to urge the valve into a valve-open position against the resilience of the diaphragm and the valve spring, a diaphragm enclosure on the downstream side of the valve, and a Pitot tube communicating with the diaphragm enclosure, and extending into the outlet port, the improvement which comprises a resilient throat element positioned adjacent the end of the Pitot tube within the outlet port so as to tend to restrict the flow of fluid past the end of the Pitot tube and to lessen the restriction of fluid flow with increasing rate of flow of fluid through the valve.

2. In a regulator valve comprising a valve body having an inlet port and an outlet port, a valve stem, a valve mounted on the valve stem and positioned between said ports, a valve spring urging the valve into a valve-closed position, a diaphragm in operative engagement with the valve stem, a regulating spring engaging the diaphragm so as to urge the valve into a valve-open position against the resilience of the diaphragm and the valve spring, a diaphragm enclosure on the downstream side of the valve, and a Pitot tube communicating with the diaphragm enclosure and extending into the outlet port, the improvement which comprises a resilient throat element positioned around the end of the Pitot tube within the outlet port so as to tend to restrict the flow of fluid past the end of the Pitot tube and to lessen the restriction of fluid flow with increasing rate of flow of fluid through the valve.

3. In a regulator valve comprising a valve body having an inlet port and an outlet port, a valve stem, a valve mounted on the valve stem and positioned between said ports, a valve spring urging the valve into a valve-closed position, a diaphragm in operative engagement with the valve stem, a regulating spring engaging the diaphragm so as to urge the valve into a valve-open position against the resilience of the diaphragm and the valve spring, a diaphragm enclosure on the downstream side of the valve, and a Pitot tube communicating with the diaphragm enclosure and extending into the outlet port, the improvement which comprises a resilient cone frustum positioned adjacent the end of the Pitot tube within the outlet port so as to tend to restrict the flow of fluid past the end of the Pitot tube and to lessen the restriction of fluid flow with increasing rate of flow of fluid through the valve.

4. In a regulator valve comprising a valve body having an inlet port and an outlet port, a valve stem, a valve mounted on the valve stem and positioned between said ports, a valve spring urging the valve into a valve-closed position, a diaphragm in operative engagement with the valve stem, a regulating spring engaging the diaphragm so as to urge the valve into a valve-open positon against the resilience of the diaphragm and the valve spring, a diaphragm enclosure on the downstream side of the valve, and a Pitot tube communicating with the diaphragm enclosure and extending into the outlet port, the improvement which comprises a resilient cone frustum positioned within the outlet port with its smaller end located downstream adjacent the end of the Pitot tube so as to tend to restrict the flow of fluid past the end of the Pitot tube and to lessen the restriction of fluid flow with increasing rate of flow of fluid through the valve.

5. In a regulator valve comprising a valve body having an inlet port and an outlet port, a valve stem, a valve mounted on the valve stem and positioned between said ports, a valve spring urging the valve into a valve-closed position, a diaphragm in operative engagement with the valve stem, a regulating spring engaging the diaphragm so as to urge the valve into a valve-open position against the resilience of the diaphragm and the valve spring, a diaphragm enclosure on the downstream side of the valve, and a Pitot tube communicating with the diaphragm enclosure and extending into the outlet port, the improvement which comprises a resiliently mounted cone frustum positioned around the Pitot tube within the outlet port, the smaller end of the frustum being downstream from the larger end and being positioned around the end of the Pitot tube so as to tend to restrict the flow of fluid past the end of the Pitot tube and to lessen the restriction of fluid flow with increasing rate of flow of fluid through the valve.

6. In a regulator valve comprising a valve body having an inlet port and an outlet port, a valve stem, a valve mounted on the valve stem and positioned between said ports, a valve spring urging the valve into a valve-closed position, a diaphragm in operative engagement with the valve stem, a regulating spring engaging the diaphragm so as to urge the valve into a valve-open position against the resilience of the diaphragm and the valve spring, a diaphragm enclosure on the downstream side of the valve, and a Pitot tube communicating with the diaphragm enclosure and extending into the outlet port, the improvement which comprises a resilient annular ring peripherally secured to the inside of the outlet port and positoned adjacent the end of the Pitot tube so as to tend to restrict the flow of fluid past the end of the Pitot tube and to lessen the restriction of fluid flow with increasing rate of flow of fluid through the valve.

7. In a regulator valve comprising a valve body having an inlet port and an outlet port, a valve stem, a valve mounted on the valve stem and positioned between said ports, a valve spring urging the valve into a valve-closed position, a diaphragm in operative engagement with the valve stem, a regulating spring engaging the diaphragm so as to urge the valve into a valve-open position against the resilience of the diaphragm and the valve spring, a diaphragm enclosure separating the diaphragm from the downstream side of the valve, and a Pitot tube communicating with the diaphragm enclosure and extending into the outlet port, the improvement which comprises a resilient cylinder having its upstream end mounted within the outlet port and its downstream end positioned around the end of the Pitot tube, the downstream end of the cylinder being free to expand with the force of the flow of fluid therethrough so as to tend to restrict the flow of fluid past the end of the Pitot tube and to lessen the restriction of fluid flow with increasing rate of flow of fluid through the valve.

References Cited in the file of this patent

UNITED STATES PATENTS

| | | |
|---|---|---|
| 2,562,415 | Chase | July 31, 1951 |
| 2,698,026 | Roberts et al. | Dec. 28, 1954 |
| 2,967,536 | Stratman | Jan. 10, 1961 |
| 2,969,748 | Staats et al. | Jan. 31, 1961 |